(12) United States Patent
Guo

(10) Patent No.: US 12,495,380 B2
(45) Date of Patent: Dec. 9, 2025

(54) METHOD AND DEVICE FOR ESTABLISHING COMMUNICATION CONNECTION IN WIRELESS NETWORK

(71) Applicant: SAMSUNG ELECTRONICS CO., LTD., Suwon-si (KR)

(72) Inventor: Chenggang Guo, Suzhou Industrial Park (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 308 days.

(21) Appl. No.: 18/493,117

(22) Filed: Oct. 24, 2023

(65) Prior Publication Data
US 2024/0205860 A1 Jun. 20, 2024

(30) Foreign Application Priority Data
Dec. 14, 2022 (CN) .......................... 202211617387.6

(51) Int. Cl.
*H04W 60/00* (2009.01)
*H04W 84/04* (2009.01)

(52) U.S. Cl.
CPC ........ *H04W 60/005* (2013.01); *H04W 84/042* (2013.01)

(58) Field of Classification Search
CPC . H04W 60/005; H04W 84/042; H04W 60/00; H04W 60/04; H04W 88/06;
(Continued)

(56) References Cited

U.S. PATENT DOCUMENTS 9,992,804 B2 6/2018 Tiwari
10,841,786 B2 11/2020 Kawasaki et al.
(Continued)

FOREIGN PATENT DOCUMENTS

CN 110741688 A 1/2020
CN 111787590 A 10/2020
(Continued)

OTHER PUBLICATIONS

Notice of Allowance issued Sep. 24, 2025 in corresponding Chinese Patent Application No. 202211617387.6.
(Continued)

*Primary Examiner* — Marisol Figueroa
(74) *Attorney, Agent, or Firm* — Morgan, Lewis & Bockius LLP

(57) ABSTRACT

A method of establishing a communication connection by a user equipment (UE) includes transmitting a first attachment request to a communication network using a PLMN and an APN; receiving a reason for rejecting the first attachment request from the communication network; and disabling an N1 mode of the UE according to the reason for rejecting, to disable a new radio (NR) standalone (SA) mode of the UE. Thereafter, a second attachment request is transmitted for establishing a communication connection with an LTE network using the same PLMN and APN. The N1 mode is re-enabled and a corresponding process is initiated when a specific condition is satisfied or a specific time period has expired. The UE reports updated ability to the communication network when the N1 mode is re-enabled. The UE supports NR SA and interworking between NR SA and LTE. The communication network does not support NR SA or interworking between the NR SA and LTE at least in a coverage area where the UE is located.

15 Claims, 7 Drawing Sheets

(58) Field of Classification Search
CPC ... H04W 8/24; H04W 36/0055; H04W 36/14; H04W 36/385
See application file for complete search history.

(56) References Cited

U.S. PATENT DOCUMENTS

| | | |
|---|---|---|
| 10,880,802 B1 | 12/2020 | Bakker |
| 11,071,043 B2 | 7/2021 | Huang-Fu et al. |
| 11,553,408 B2 | 1/2023 | Surisetty et al. |
| 11,564,195 B2 | 1/2023 | Kumar et al. |
| 2018/0288724 A1 | 10/2018 | Wu |
| 2019/0141581 A1 | 5/2019 | Syue et al. |
| 2020/0092706 A1 | 3/2020 | Kawasaki et al. |
| 2020/0296662 A1 | 9/2020 | Kaura et al. |
| 2021/0204180 A1 | 7/2021 | Chun |
| 2021/0258857 A1* | 8/2021 | Won .................. H04W 48/18 |
| 2021/0321477 A1* | 10/2021 | Niemi ................ H04W 76/18 |

FOREIGN PATENT DOCUMENTS

| | | | |
|---|---|---|---|
| CN | 113543248 A | 10/2021 | |
| CN | 114223261 A | 3/2022 | |
| CN | 115413421 A | 11/2022 | |
| EP | 3629640 A1 * | 4/2020 | ........... H04W 60/06 |
| EP | 3799488 | 3/2021 | |
| WO | 2019182430 | 9/2019 | |

OTHER PUBLICATIONS

Cisco, "MME Administration Guide, StarOS Release 21.8", Cisco Systems, Inc., Apr. 26, 2018, 732 pages.
Office Action dated Mar. 31, 2025 issued in corresponding Chinese Patent Application No. 202211617387.6 .

* cited by examiner

METHOD AND DEVICE FOR ESTABLISHING COMMUNICATION CONNECTION IN WIRELESS NETWORK

CROSS REFERENCE TO RELATED APPLICATION

This application is related to and claims priority to Chinese patent application no. 202211617387.6, filed in the Chinese Intellectual Property Office on Dec. 14, 2022, the entire contents of which are incorporated herein by reference in its entirety.

TECHNICAL FIELD

The present disclosure generally relates to wireless communications and more particularly to a method and a device for establishing a communication connection in a wireless network.

DISCUSSION OF RELATED ART

In modern mobile communication, a user equipment (UE) initiates an attachment process by transmitting an attachment request to a mobile management entity (MME), and establishes a default bearer by transmitting a connection request in a packet data network (PDN). In accordance with Fifth Generation New Radio (5G NR), which is a radio access technology developed by the Third Generation Partnership Project (3GPP), an "N1 mode" is a mode of a UE allowing access to a 5G core network. An Information Element (IE) is a group of information that may be included within a signaling message or data flow that is sent across an interface. When the N1 mode is enabled, an IE configuration of the N1 mode for an attachment request is supported, and the PDN connection request contains a protocol data unit (PDU) session identification. After the N1 mode is disabled, the IE configuration of the N1 mode for the attachment request is not supported and the PDN connection request does not contain a PDU session identification.

A network slice may be defined as a logical network and a partition of a 3GPP compliant wireless network. A network slice may be created for serving a particular purpose or a set of customers, and may be identified using Single Network Slice Selection Assistance Information (S-NSSAI). The communication network to which an attachment request is made uses the PDU session identification to associate the PDN connection, the default bearer, the PDU session and a S-NSSAI.

"New radio standalone" (NR SA) of 5G NR is a mode in which 5G cells are used for both signaling and information transfer. NR SA includes a 5G packet core architecture instead of relying on the 4G Evolved Packet Core, and allows for the deployment of 5G without the Long Term Evolution (LTE) 4G network. Generally, a UE may travel between a 5G coverage area and an LTE coverage area, such that interworking between the 5G network and the LTE network is initiated to maintain continuity of service. In accordance with the current 3GPP protocol (e.g., 5G NR Release 17 and legacy system, i.e. a previous cellular mobile system) a scenario may exist where the UE supports NR SA and interworking between NR SA and LTE but the communication network to which attachment is requested does not support NR SA or interworking between NR SA and LTE (at least in a coverage area where the UE is located). In this case, if the attachment request or the default PDN connection initiated by the UE to the LTE network is rejected for a certain reason, there is no corresponding clear definition of the rejecting reason. As a result, the UE may be unable to register in the LTE network.

SUMMARY

According to one aspect of exemplary embodiments, a method of establishing a communication connection by a user equipment (UE) is provided, the method includes: transmitting a first attachment request to a communication network using a public land mobile network (PLMN) and an access point network (APN), and receiving a "reason for rejecting" (e.g., a message indicating a reason for rejecting) the first attachment request from the communication network. An N1 mode of the UE is disabled according to the reason for rejecting the first attachment request, to disable an NR SA mode of the UE. Thereafter, a second attachment request is transmitted to the communication network for establishing a communication connection with an LTE network using the same PLMN and APN, The N1 mode is re-enabled and a corresponding process is initiated when at least one specific condition is satisfied or a specific time period has expired. The UE reports updated ability to the communication network when the N1 mode is re-enabled. The UE supports the NR SA and interworking NR SA and LTE, but the communication network does not support NR SA or interworking between the NR SA and LTE at least in a coverage area where the UE is located.

In various embodiments:

The disabling of the NR SA may include: initiating a timer with a specific period when disabling the NR SA, wherein the period is configured by a network or customized by the user equipment and has a default value.

The receiving of the reason for rejecting the first attachment request from the communication network may include: receiving, from the communication network, a reason for evolved-packet-system mobility management (EMM) with respect to the first attachment request and a reason for evolved-packet-system session management (ESM) with respect to a PDN connection request.

The receiving of the reason for rejecting the first attachment request from the communication network may further include: receiving, from the communication network, a response and a reason indicating the user equipment to be detached.

The N1 mode may be enabled and the corresponding process may be initiated after the timer expires, to report the updated ability.

The timer may be stopped, the N1 mode enabled and the corresponding process initiated, to report the updated ability when one of following conditions occur: the UE selects a different PLMN and APN; the UE enters a different tracking area (TA); the UE is powered off and on again; or a universal subscriber identity module (USIM) is removed from the UE.

According to another aspect of exemplary embodiments, a method of establishing a communication connection by a communication network is provided, the method includes: receiving a first attachment request transmitted from a UE using a PLMN and an APN, and determining whether to reject the first attachment request; transmitting a reason for rejecting the first attachment request to the UE when the first attachment request is rejected; and receiving a second attachment request, from the UE, with respect to an LTE network and establishing a communication connection with the UE using the same PLMN and APN under a condition in which the UE has disabled a NR SA mode, wherein the UE supports NR SA and interworking between NR SA and LTE, and the communication network does not support NR SA or the interworking between NR SA and LTE at least in a coverage area in which the UE is located.

The transmitting the reason for rejecting the first attachment request to the user equipment may include: transmitting, to the UE, a reason for EMM rejection with respect to the first attachment request and a reason ESM rejection with respect to a PDN connection request.

The transmitting the reason for rejecting the first attachment request to the user equipment may further include: transmitting, to the user equipment, a response and a reason indicating the user equipment is to be detached.

According to another aspect, a device for establishing a communication connection is provided, the device includes: a first communication module configured to transmit a first attachment request to a communication network using a public land mobile network PLMN, and receive a reason for rejecting the first attachment request from the communication network; a second communication module configured to transmit a second attachment request, to the communication network again, and establish a communication connection with an LTE network using the same PLMN and access point network APN in a case where the user equipment disables a new radio NR standalone SA; a disabling module configured to disable the new radio NR standalone SA according to the reason for rejecting the attachment request; and an initiating module configured to enable the N1 mode again and initiate the corresponding process, to report the updated ability, when a specific condition or a specific period is satisfied, wherein the device supports the NR SA and an interoperation between the NR SA and LTE, and the communication network does not support the NR SA or the interoperation between the NR SA and LTE.

According to yet another aspect, a device of establishing a communication connection is provided, the device includes: a first receiving module configured to receive a first attachment request transmitted from a user equipment using a public land mobile network PLMN, and determine whether to reject the first attachment request; a transmitting module configured to transmit a reason for rejecting the first attachment request to the user equipment when the first attachment request is rejected; and a second receiving module configured to receive a second attachment request, from the user equipment, with respect to an LTE network and establishing a communication connection with the user equipment in the same PLMN and access point network APN in a case where the user equipment disables a new radio NR standalone SA, wherein the user equipment supports the NR SA and an interoperation between the NR SA and LTE, and the device does not support the NR SA or the interoperation between the NR SA and LTE.

According to another aspect of exemplary embodiments, a computer-readable storage medium storing instructions is provided, wherein when executed by at least one processor, the instructions cause the at least one processor to execute operations to implement any one of the methods delineated above.

At least the following advantageous effects may be realized according to the technical solutions provide by the embodiments of the present disclosure: under the scenario where the operator network which does not support NR SA and interworking between the NR SA and the LTE, directly rejects the attachment request initiated by the UE which does support NR SA and/or interworking between NR SA and LTE, the UE is able to disable the N1 mode so as to register on an LTE network and establish a PDN connection.

BRIEF DESCRIPTION OF THE DRAWINGS

The above and other aspects, features and advantages of the present disclosure will be more clearly understood through the following description for the exemplary embodiments taking in conjunction with the accompanying drawings in which.

DETAILED DESCRIPTION

The following detailed descriptions are provided to help the reader gain a comprehensive understanding of the method, apparatus and/or system described here. However, variations and equivalents of the method, apparatus and/or system described herein may be made without departing from the scope of the inventive concept. For example, except for any operation that logically occurs in a particular order, an operation order described herein is only an example, and can be varied as desired. In addition, for clarity and brevity, descriptions of the features already known in the art may be omitted.

Some examples of an apparatus for establishing a communication connection according to the present inventive concept may include at least one or a combination of the following apparatuses: a mobile smartphone, a tablet PC, a laptop PC, an e-book reader, a personal digital assistant (PDA), a portable multimedia player, a mobile medical apparatus, a wearable apparatus (for example, an electronic bracelet, an electronic watch, an electronic collar and the like), a home appliance (for example, a TV, a refrigerator, an air conditioner, a vacuum cleaner, an oven, a microwave oven, a washing machine and an air purifier), a navigation device, a vehicle communication device and the like.

Figure 1:
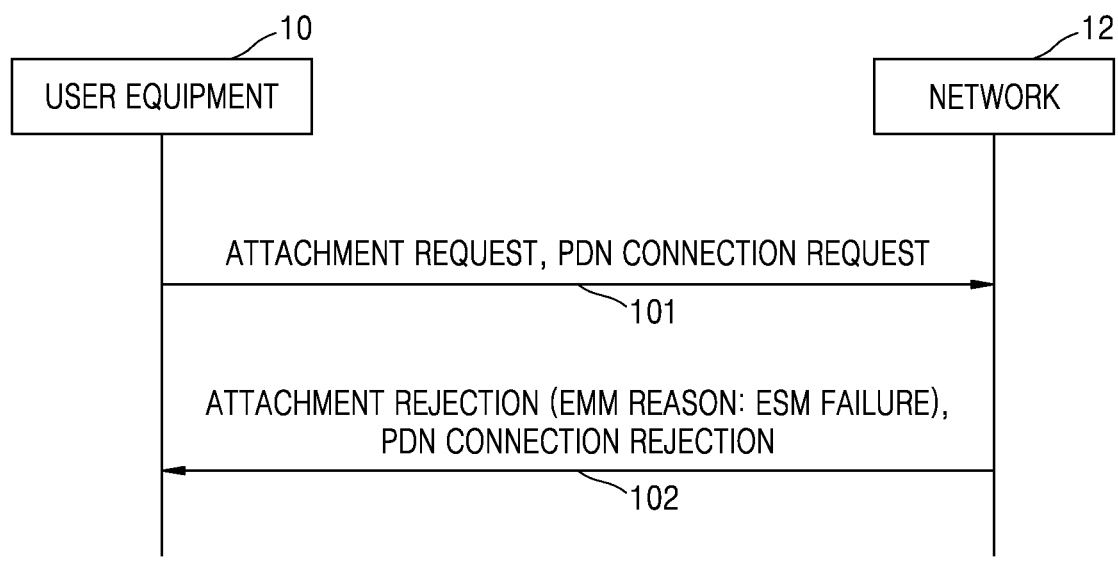
FIG. 1 is a flowchart illustrating a communication network rejecting a communication connection from a UE in an existing 3GPP protocol.

FIG. 1 is a flowchart illustrating a related art communication network rejecting a communication connection from a UE in accordance with an existing 3GPP protocol (e.g., 5G NR Release 17 and legacy systems). In this scenario, a UE 10 supports NR SA and interworking between NR SA and an LTE compliant network (hereafter, just "LTE"), and a communication network 12, in a coverage region where UE 10 is located, does not support either NR SA or interworking between NR SA and LTE.

In operation 101, the UE 10 uses a public land mobile network (PLMN) and APN (both within network 12) to transmit to the communication network 12 an attachment request for which the IE configuration of the N1 mode is supported (indicating a request for 5G based communication). The UE 10 also transmits a PDN connection request containing the PDU session ID. Here, the communication network 12 may use the PDU session ID to identify and associate the PDU session and single-network slice selection assistant information (S-NSSAI).

In response to receiving the attachment request, the communication network 12 transmits, to the UE 10, response information rejecting the attachment and rejecting the PDN connection (operation 102).

In an existing 3GPP protocol, as illustrated in FIG. 1, if the PDN connection rejection message is "ESM failure" informed by the EMM layer (that is, the EMM reason "ESM failure" included in the attachment rejection information), the UE can only select a different APN to establish a connection with the LTE network (within network 12), or fall back to 3G/2G.

Figure 2:
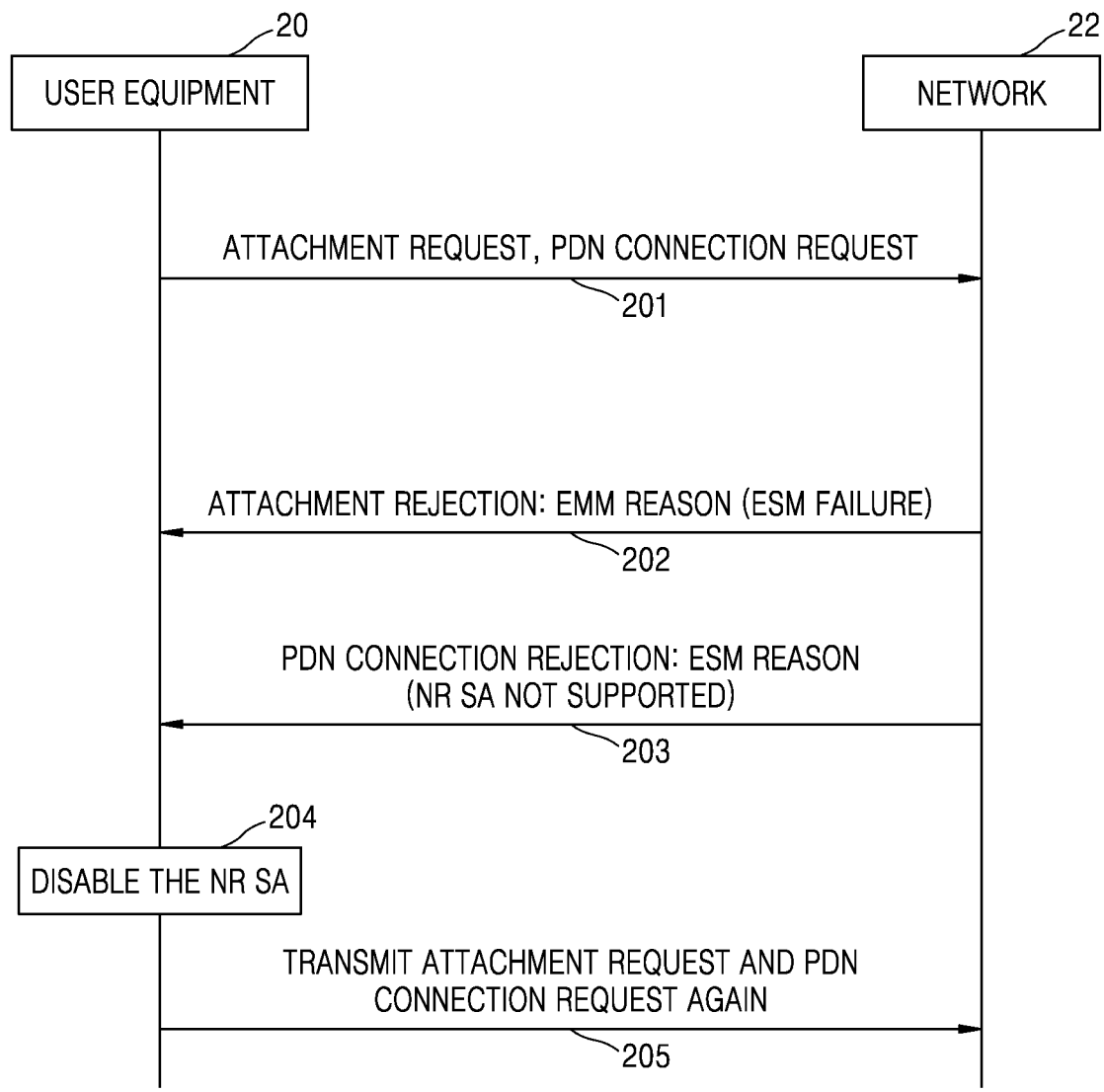
FIG. 2 is a flowchart illustrating a method for establishing a communication connection according to an exemplary embodiment of the present disclosure.

FIG. 2 is a flowchart illustrating a method for establishing a communication connection according to an exemplary embodiment of the present disclosure. The method may operate in a scenario in which a UE 20 supports NR SA and interworking between NR SA and LTE, but a communication network 22 to which attachment is requested does not support NR SA and interworking between NR SA and LTE in a coverage region where UE 20 is located.

In operation 201, the UE 20 transmits to the communication network 22 (using a PLMN and APN within network 22) an attachment request and a PDN connection request, where the IE configuration of the N1 mode for the attachment request is supported, and the PDN connection request contains the PDU session identification.

In operation 202, in response to receiving the attachment request and the PDN connection request transmitted by the UE 20, the communication network 22 transmits, to the UE 12, EMM reason "ESM failure" for rejecting the attachment request with respect to the attachment request. Network 22 additionally transmits to the UE 20 an ESM reason (an ESM message) "NR SA not supported" for rejecting the PDN connection request with respect to the PDN connection request.

In operation 203, the UE 20 disables the NR SA in response to the received ESM reason "NR SA not supported" for the communication network 22 rejecting the PDN connection request. The UE 20 may also initiate a timer with a specific period (e.g., a default value of 12 hours) when disabling the NR SA. Here, the period of the timer may be designated by the network or customized by the UE.

In operation 204, with NR SA disabled (the N1 mode is disabled), the UE 20 again transmits an attachment request to the communication network 22 and is able to establish a communication connection with an LTE network (part of network 22) using the same PLMN and APN as in operation 201. With the N1 mode disabled, a different IE configuration (the IE configuration of the N1 mode for the 5G based attachment request is not supported) may be indicated in the transmitted message, e.g., associated with an LTE attachment request, and the PDN connection request may not contain a PDU session identification. The UE 20 may also initiate a timer with a specific period (e.g., a default value of 12 hours) when disabling the NR SA. Here, the period of the timer may be designated by the network 22 or customized by the UE 20.

It is noted here that in operation 204, if a timer has been set as mentioned earlier, even if the UE 20 has become successfully attached to the network 22 via LTE, when the timer expires, the UE 20 may then re-enable NR SA and thereafter make a further attempt at 5G based communication. For example, if the UE 20 moved to a 5G coverage area or a coverage area in which interworking between NR SA and LTE is available, 5G based communication may be available.

According to the method of FIG. 2 just described, the UE may adjust an internal setting to re-initiate the LTE network registration and PDN connection according to the corresponding rejection reason. By contrast, in the related art method of FIG. 1, since the communication network does not provide the UE with an ESM reason such as "NR SA not supported" for rejecting the PDN connection request (this type of messaging is not prescribed in an existing 3GPP protocol or version), the UE cannot acquire the specific reason for a connection failure. Consequently, the UE cannot make a corresponding adjustment according to the reason for rejection.

Figure 3:
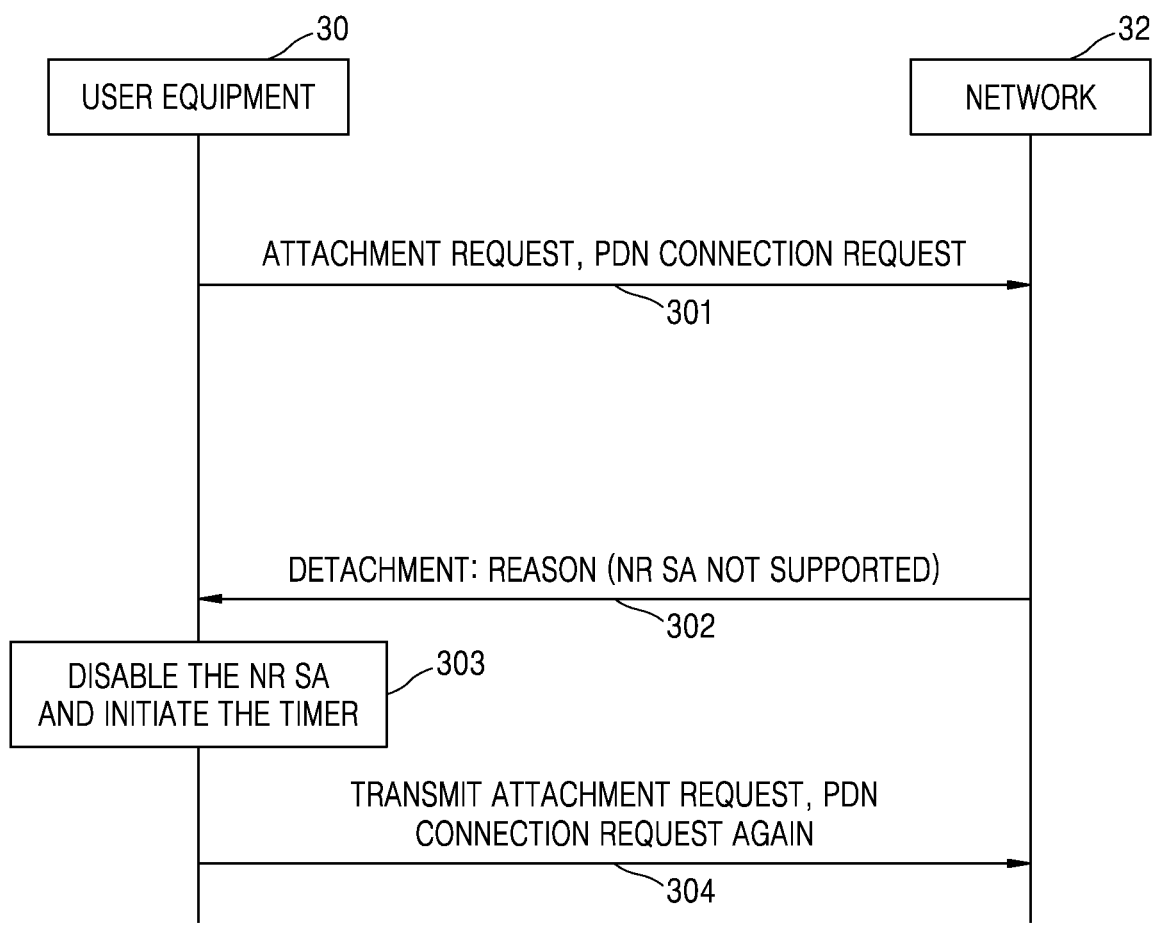
FIG. 3 is a flowchart illustrating a method for establishing a communication connection according to another exemplary embodiment of the present disclosure.

FIG. 3 is a flowchart illustrating a method for establishing a communication connection according to another exemplary embodiment of the present disclosure.

In operation 301, a UE 30 that supports NR SA and interworking between NR SA LTE transmits a message to a communication network 32 that does not support NR SA or interworking between NR SA and LTE in a coverage region where the UE 30 is located. The message contains an attachment request and a PDN connection request, where the IE configuration of the N1 mode for the attachment request is supported, and the PDN connection request contains the PDU session identification.

In operation 302, upon receiving the attachment request and the PDN connection request transmitted by the UE 30, the communication network 32 transmits, to the UE 30, a detachment response of "re-attach required" with respect to the attachment request: with the reason "NR SA not supported". (Note that the UE 30 may have been previously attached to an LTE network within the communication network 32, prior to initiating an NR SA based attachment request in operation 301.)

In operation 303, the UE 30 disables the NR SA in response to the received reason "NR SA not supported" for the communication network 32 being detached. The UE 30 may also initiate a timer with a specific period (e.g., a default value of 12 hours) when disabling the NR SA. Here, the period of the timer may be designated by the network 32 or customized by the UE 30.

In operation 304, the UE 30 again transmits an attachment request to the communication network for establishing a communication connection with an LTE network using the same PLMN and APN when NR SA is disabled. When the N1 mode is disabled, the IE configuration of the N1 mode for an attachment request is unsupported and the PDN connection request does not contain a PDU session identification.

According to the embodiment of FIG. 3, through a clear detachment reason value transmitted to the UE 30, the UE 30 may disable NR SA by disabling the N1 mode, and thereby register the LTE successfully and establish a PDN connection. In this manner, the UE 30 can also avoid attempts at searching and registration repeatedly between LTE and NR SA of the communication network 32. Such avoidance of repetitive searching and registration may reduce power consumption caused by invalid NR SA cell search as well as the cell selection and registration, and the communication network 32 may thereby reduce the invalid signal load accordingly.

Note that in operation 303, if a timer has been set as mentioned above, even if the UE 30 has become successfully attached to the network 32 via LTE, when the timer expires, the UE 30 may then re-enable NR SA and thereafter make a further attempt at 5G based communication.

Figure 4:
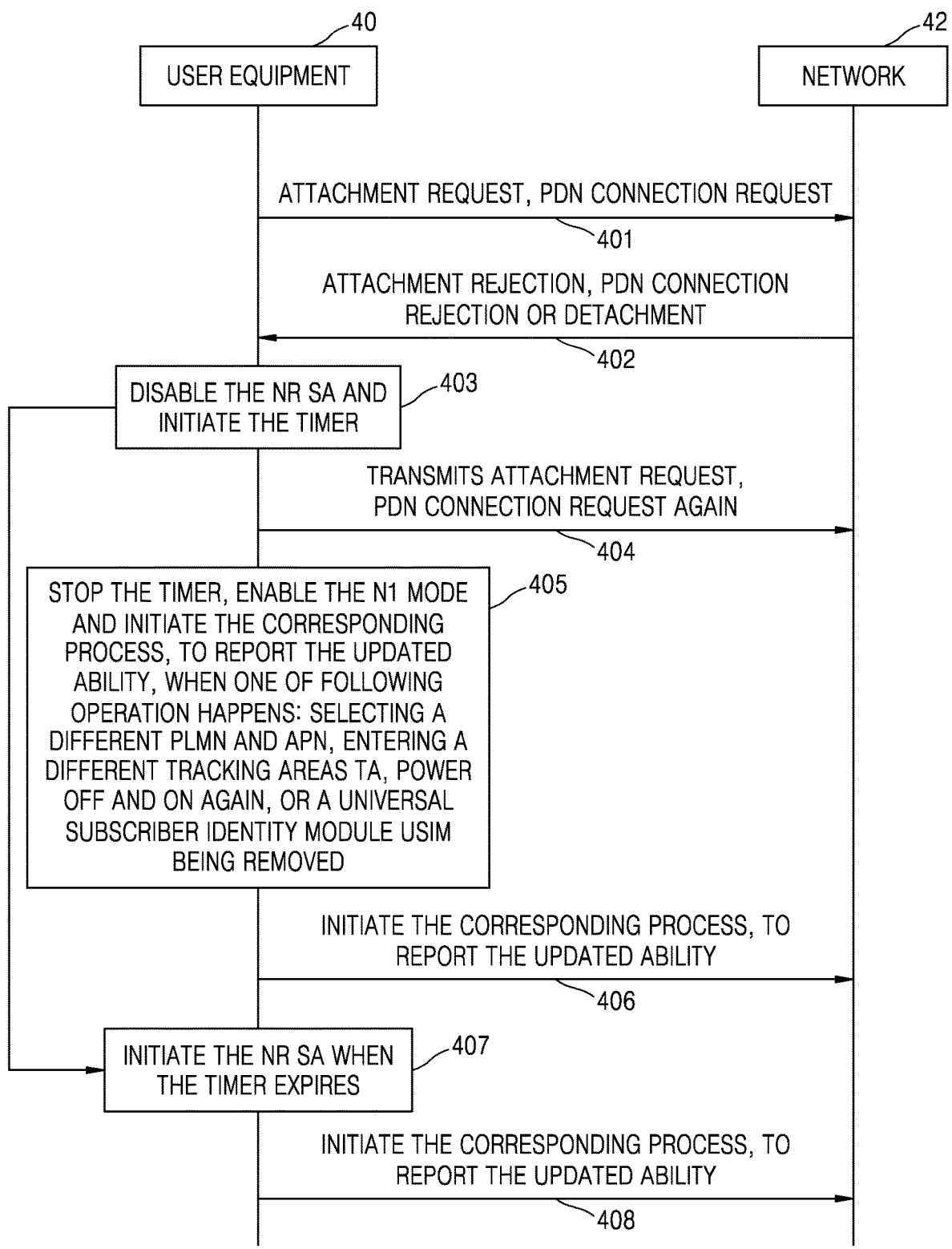
FIG. 4 is a flowchart illustrating enabling an N1 mode according to another exemplary embodiment of the present disclosure.

FIG. 4 is a flowchart illustrating a method involving re-initiating NR SA according to an exemplary embodiment of the present disclosure.

In operation 401, a UE 40 that supports NR SA and interworking between NR SA and LTE uses a PLMN and APN to transmit a message to a communication network 42. Communication network 42 does not support NR SA or interworking between NR SA and LTE in a coverage area where UE 40 is located. The transmitted message includes an attachment request and a PDN connection request, where the IE configuration of the N1 mode for the attachment request is supported, and the PDN connection request contains the PDU session identification.

In operation 402, in response to receiving the attachment request and PDN connection request transmitted by the UE 40, the communication network 42 transmits, to the UE 40, EMM reason "ESM failure" for rejecting the attachment request with respect to the attachment request; and additionally transmits to UE 40 the ESM reason "NR SA not supported" for rejecting the PDN connection request with respect to the PDN connection request. Alternatively, upon receiving the attachment request and the PDN connection request transmitted by the UE 40, the communication network 42 transmits to UE 40 a detachment response of "re-attachment required" with respect to the attachment request: the reason "NR SA not supported" (as in the embodiment of FIG. 3).

In operation 403, the UE 40 disables NR SA in response to the received reason "NR SA not supported" for the communication network 42 rejecting the PDN connection request, and initiates a timer with a specific period (e.g., a default value of 12 hours). Here, the period of the timer may be designated by the network 42 or customized by the UE 40.

In operation 404, the UE 40 again transmits an attachment request to the communication network 42 for establishing a communication connection with an LTE network (within network 42) using the same PLMN and APN as in operation 401, while NR SA is disabled. Here, the IE configuration of the N1 mode for an attachment request is not supported and the PDN connection request does not contain a PDU session identification.

In operation 405, the timer may be stopped, the N1 mode may be enabled and a corresponding process is initiated to report updated ability (e.g., N1 mode ability) when one of the following conditions occurs: (i) the UE 40 selects a different PLMN and/or APN; (ii) the UU 40 enters a different tracking area (TA); (iii) the UE 40 powers off and on again; or (iv) a universal subscriber identity module (USIM) is removed. the N1 The corresponding process to report the updated ability may then be initiated (operation 406) (e.g., the UE 40 may transmit a message to the network 42 indicating the N1 mode has become enabled).

On the other hand, if none of the conditions in operation 405 occur prior to the timer expiring (as set in operation 403), the timer may expire, at which time the NR SA may be initiated (operation 407). Thereafter, in operation 408, the corresponding process may be initiated to report the updated ability (the UE may transmit a message to the network 42 indicating the N1 mode has become enabled).

According to the embodiment of FIG. 4 just described, the UE 40 may perform LTE communication after disabling the N1 mode and disabling the NR SA with respect to the communication network 42 which does not support NR SA and interworking between NR SA and LTE (at least in the coverage area where UE 40 is located). Further, the UE 40 may re-initiate NR SA when a timer expires or under certain conditions, so as to be connected with another network (within communication network 42) which supports NR SA or interworking between NR SA and LTE.

Figure 5:
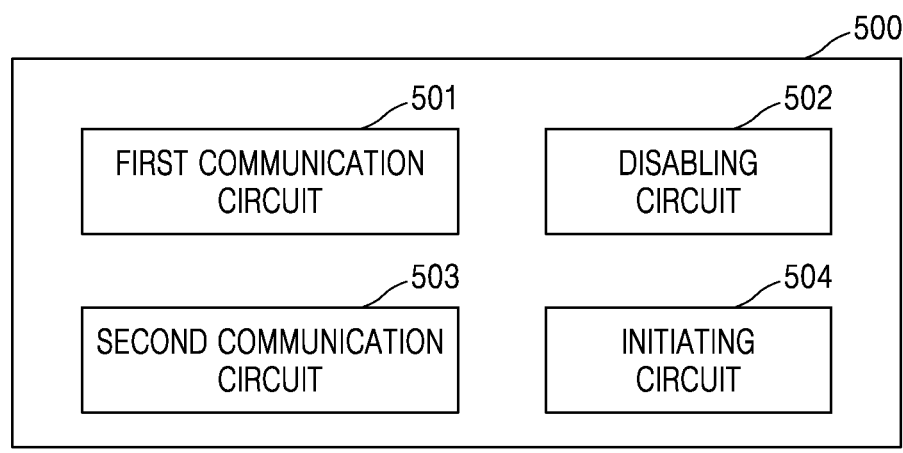
FIG. 5 is a schematic diagram illustrating a device at a UE side for establishing a communication connection according to an exemplary embodiment of the present disclosure.

FIG. 5 is a schematic diagram illustrating a device, 500, at a UE side (e.g., circuitry within any of UEs 20, 30 or 40 described above) for establishing a communication connection according to an exemplary embodiment of the present disclosure.

In the present embodiment, the device 500 may include: a first communication circuit 501 configured to transmit an attachment request and PDN connection request to a communication network using a public land mobile network PLMN, and receive a reason for rejecting the attachment request from the communication network; a disabling circuit 502 configured to disable the new radio NR standalone SA according to the reason for rejecting the attachment request; and a second communication circuit 503 configured to transmit the attachment request, to the communication network again, and establish a communication connection with an LTE network using the same PLMN and APN in a case where the user equipment disables a new radio NR standalone SA, wherein the IE configuration of the N1 mode for the attachment request transmitted by the first communication circuit 501 is not supported, and the PDN connection request transmitted by the first communication circuit 501 contains a PDU session identification; and the IE configuration of the N1 mode for an attachment request transmitted by the second communication circuit 503 after the N1 mode is disabled is not supported, and the PDN connection request transmitted by the second communication circuit 503 after the N1 mode is disabled does not contain a PDU session identification, and wherein the device 500 supports the NR SA and interworking between the NR SA and LTE, and the communication network does not support the NR SA or interworking between the NR SA and LTE at least in a coverage area where the UE is located. Alternatively, the device 500 for establishing the communication connection may further include a memory (not shown). The memory may be configured to store the NR SA configuration to re-initiate the NR SA.

The disabling circuit 502 disabling the NR SA includes: initiating a timer with a specific period when disabling the NR SA.

The receiving of the reason for rejecting the attachment request from the communication network by the first communication circuit 501 includes: receiving, from the communication network, a reason for evolved-packet-system mobility management EMM with respect to the attachment request and a reason for evolved-packet-system session management ESM with respect to a PDN connection request.

The receiving of the reason for rejecting the attachment request from the communication network by the first communication circuit 501 further includes: receiving, from the communication network, a response and a reason indicating the user equipment to be detached.

The device 500 for establishing the communication connection may further include: an initiating circuit 504 configured to enabling the N1 mode again and initiate the corresponding process after the timer expires, to report the updated ability. Here, the timer is stopped, the N1 mode is enabled and the corresponding process is initiated, to report the updated ability when one of following operation happens: selecting a different PLMN and APN, entering a different tracking area, power off and on again, or a universal subscriber identity module USIM being removed.

Figure 6:
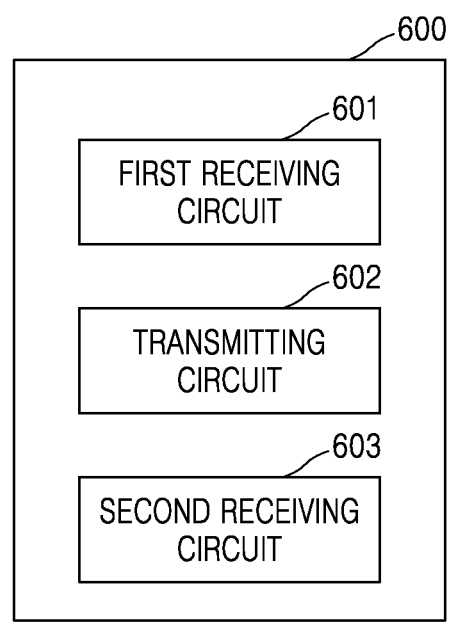
FIG. 6 is a schematic diagram illustrating a device at a communication network side for establishing a communication connection according to an exemplary embodiment of the present disclosure.

FIG. 6 is a schematic diagram illustrating a device at a communication network side for establishing a communication connection according to an exemplary embodiment of the present disclosure.

In the present embodiment, the device 600 at the communication network side for establishing the communication connection may include: a first receiving circuit 601 configured to receive an attachment request and a PDN connection request transmitted from a user equipment using a public land mobile network PLMN, and determine whether to reject the attachment request; a transmitting circuit 602 configured to transmit a reason for rejecting the attachment request to the user equipment when the attachment request is rejected; and a second receiving circuit 603 configured to receive another attachment request, from the user equipment, with respect to an LTE network and establishing a communication connection with the user equipment using the same PLMN and APN in a case where the user equipment disables a new radio NR standalone SA, wherein the IE configuration of the N1 mode for the attachment request received by the first receiving circuit 601 is supported, and the PDN connection request received by the first receiving circuit 601 contains a PDU session identification; and the IE configuration of the N1 mode for the attachment request received by the second receiving circuit 603 after the N1 mode is disabled is not supported and the PDN connection request received by the second receiving circuit 603 after the N1 mode is disabled does not contain a PDU session identification, and wherein the user equipment supports the NR SA and an interoperation between the NR SA and LTE, and the device 600 does not support the NR SA or the interoperation between the NR SA and LTE.

The transmitting circuit 602 transmitting the reason for rejecting the attachment request to the user equipment includes: transmitting, to the user equipment, a reason for evolved-packet-system mobility management EMM with respect to the attachment request and a reason for evolved-packet-system session management ESM with respect to a PDN connection request.

The transmitting circuit 602 transmitting the reason for rejecting the attachment request to the user equipment further includes: transmitting, to the user equipment, a response and a reason indicating the user equipment to be detached.

Figure 7:
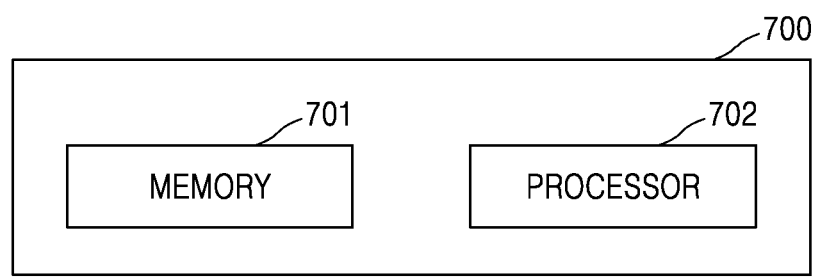
FIG. 7 is a block diagram illustrating an electronic apparatus for establishing a communication connection according to an exemplary embodiment of the present disclosure.

FIG. 7 is a block diagram illustrating an electronic apparatus 700 for establishing a communication connection according to an exemplary embodiment of the present disclosure.

With reference to FIG. 7, the electronic apparatus 700 may include at least one memory 701 and at least one processor 702, the at least one memory stores computer-executable instruction sets, which, when executed by at least one processor, perform the method of establishing a communication connection according to an embodiment of the present disclosure. Here, the electronic apparatus 700 may be an electronic apparatus on the UE side, and may also be an electronic apparatus on the communication network side.

As an example, the electronic apparatus may be a PC computer, a laptop device, a personal digital assistant, a smartphone or other devices that can execute the above instruction set. Here, the electronic apparatus is not necessarily a single electronic apparatus, and may also be any aggregation of the device or circuit that can execute the above instructions (or instruction set) separately or jointly. The electronic apparatus may also be a part of the integrated control system or system manager, or may be configured to be a portable electronic apparatus connected with the local or remote (for example, via wireless transmission) via the interface.

In the electronic apparatus, the processor may include a central processing unit (CPU), a graphics processing unit (GPU), a programmable logic device, a dedicated processor system, a microcontroller or a microprocessor. As an example rather than a limitation, the processor may further includes an analog processor, a digital processor, a microprocessor, a multicore processor, a processor array, a network processor and the like.

The processor may operate the instruction or code stored in the memory, wherein the memory may further store data. The instruction and data may also be transmitted and received by the network via the network interface, wherein the network interface device may adopt any transmission protocol that is already known.

The memory may be integrated with the processor, for example, the RAM or flash memory is arranged within the integrated circuit microprocessor and the like. In addition, the memory may include separate apparatuses, for example, an eternal disk drive, a storage array or any other storage device that can be used by the database system. The memory and the processor may be coupled in operation, or may communicate with each other by, for example, the I/O terminal port, the network connection and the like, so that the processor may read the documents stored in the memory.

In addition, the electronic apparatus may also include a video display (for example, a liquid crystal display) and a user interaction interface (for example, a keyboard, a mouse, a touch input apparatus and the like). All the components of the electronic apparatus may be connected with each other via bus and/or network.

According to an exemplary embodiment of the present disclosure, a non-transitory computer-readable medium storing instructions may also be provided, wherein, when operated by at least one processor, the instructions cause the at least one processor to execute a method of establishing a communication connection according to any of the exemplary methods of the present disclosure described above. Examples of the computer-readable storage medium here includes: Read Only Memory (ROM), Programmable Read Only Memory (PROM), Electrically Erasable Programmable Read Only Memory (EEPROM), Random Access Memory (RAM), Dynamic Random Access Memory (DRAM), Static Random Access Memory (STAM), a flash memory, a nonvolatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blue-ray or CD-ROM memory, Hard Disk Drive (HDD), Solid State Disk (SSD), a card memory (for example, a multimedia card, a Secure Digital (SD) card or an Extreme Digital (XD) card), a magnetic tape, a floppy disk, a magneto-optical data storage device, an optical data storage device, a hard disk and any other devices, and the any other devices are configured to store a computer program and any associated data, data file and data structure in a non-transitory manner, and provide the computer program and any associated data, data file and data structure to the processor or computer, so that the processor or computer can execute the computer program. The computer program in the above computer-readable storage medium may be operated in an environment deployed in a computer apparatus such as a client, host, agent apparatus, server and the like, in addition, in one example, the computer program and any associated data, data file and data structure are distributed on the networked computer system, so that the computer program and any associated data, data file and data structure are stored, accessed and executed by one or more processors or computers in a distribution manner.

According to an exemplary embodiment of the present disclosure, a computer program product may also be provided. The instructions in the computer program product may be executed by at least one processor in the electronic apparatus to execute the method of establishing a communication connection according to an exemplary embodiment of the present disclosure as described above.

It should be understood that various embodiments of the present disclosure and the terms used therein do not intend to limit the technical features stated here to specific embodiments, but to include various variations, equivalent forms or replacement forms with respect to the corresponding embodiments. As used associatively with various embodiments of the present disclosure, the term "circuit" may include units implemented in hardware, software or firmware, and may be used interchangeable with other terms (for example, "logic", "logical block", "part", "engine", "processor", or "circuitry") A circuit may be a single integrated part or the smallest unit or part of the single integrated part that is adapted to execute one or more functions. For example, according to the embodiments, the circuit can be implemented in the form of application specific integrated circuit (ASIC). Any of the above circuits may be a processor that reads and executes instructions stored in a memory to carry out its functionality.

The method and the apparatus of establishing a communication connection according to the exemplary embodiments of the present disclosure have been described by referring to FIGS. 2-7. However, it should be understood: the electronic apparatus shown in FIGS. 5 and 6 and the circuitry thereof may be configured to execute the software, hardware, firmware or any combination of the above items with specific functions, the electronic apparatus shown in FIG. 7 is not limited to including the components shown above, but some components that may be added or deleted as needed, and the above components may also be combined.

While the inventive concept has been particularly shown and described with reference to embodiments thereof, it will be understood that various changes in form and details may be made therein without departing from the spirit and scope of the following claims and their equivalents.

What is claimed is:

1. A method of establishing a communication connection by a user equipment (UE), comprising:
   transmitting a first attachment request to a communication network using a public land mobile network (PLMN) and an access point network (APN), and receiving a reason for rejecting the first attachment request from the communication network;
   disabling an N1 mode of the UE according to the reason for rejecting the first attachment request, to disable a new radio (NR) standalone (SA) mode of the UE;
   transmitting a second attachment request to the communication network and establishing a communication connection with a Long Term Evolution (LTE) network using the same PLMN and APN;
   re-enabling the N1 mode and initiating a corresponding process when at least one specific condition is satisfied or a specific time period has elapsed; and
   reporting, by the UE, updated ability to the communication network when the N1 mode is re-enabled,
   wherein the UE supports NR SA and interworking between NR SA and LTE, and the communication network does not support NR SA or interworking between NR SA and LTE at least in a coverage area where the UE is located.

2. The method of claim 1, further comprising initiating a timer with the specific time period when the NR SA mode is disabled, wherein the specific time period is configured by the communication network or customized by the UE.

3. The method of claim 1, wherein the receiving of the reason for rejecting the first attachment request from the communication network comprises: receiving, from the communication network, a reason for evolved-packet-system mobility management (EMM) with respect to the first attachment request and a reason for evolved-packet-system session management (ESM) with respect to a PDN connection request.

4. The method of claim 1, further comprising receiving, by the UE from the communication network, a message indicating the UE is to be detached, concurrently with receiving the reason for rejecting the first attachment.

5. The method of claim 2, wherein the N1 mode is re-enabled and the corresponding process is initiated after the timer expires.

6. The method of claim 1, wherein the at least one specific condition comprises: the UE selects a different PLMN and APN; the UE enters a different tracking area TA; the UE powers off and on again, or a universal subscriber identity module (USIM) is removed from the UE.

7. A method of establishing a communication connection by a communication network, comprising:
   receiving a first attachment request transmitted from a user equipment (UE) using a public land mobile network (PLMN) and an access point network (APN), and determining whether to reject the first attachment request;
   transmitting a reason for rejecting the first attachment request to the UE when the first attachment request is rejected; and
   receiving a second attachment request from the UE, with respect to a Long Term Evolution (LTE) network and establishing a communication connection with the UE using the same PLMN and APN when the second attachment request indicates that the UE has disabled a new radio (NR) standalone (SA) mode of the UE,
   wherein the UE supports NR SA and interworking between NR SA and LTE, and the communication network does not support NR SA or interworking between the NR SA and LTE at least in a coverage area where the UE is located.

8. The method of claim 7, wherein the transmitting of the reason for rejecting the first attachment request to the UE comprises: transmitting, to the UE, a reason for evolved-packet-system mobility management (EMM) with respect to the first attachment request and a reason for evolved-packet-system session management (ESM) with respect to a PDN connection request.

9. The method of claim 7, further comprising transmitting, to the UE, a response to the first attachment request indicating that the UE is to be detached.

10. A device for establishing a communication connection, comprising:
   a first communication circuit configured to transmit a first attachment request to a communication network using a public land mobile network (PLMN) and an access point network (APN), and receive a reason for rejecting the first attachment request from the communication network;
   a second communication circuit configured to transmit a second attachment request to the communication network and establish a communication connection with a Long Term Evolution (LTE) network using the same PLMN and APN under a condition in which a new radio (NR) standalone (SA) mode of the device is disabled;
   a disabling circuit configured to disable the NR SA mode according to the reason for rejecting the first attachment request; and
   an initiating circuit configured to enable an N1 mode and initiate a corresponding process to report updated ability, when at least one specific condition is satisfied or a specific time period has elapsed,
   wherein the device supports NR SA and interworking between NR SA and, and the communication network does not support NR SA or interworking between the NR SA and LTE at least in a coverage area where the device is located.

11. The device of claim 10, wherein the disabling circuit is configured to: initiate a timer with the specific time period when disabling the NR SA mode, wherein the period is configured by the communication network or customized by the device.

12. The device of claim 10, wherein the receiving of the reason for rejecting the first attachment request from the communication network by the first communication circuit comprises: receiving, from the communication network, a reason for evolved-packet-system mobility management (EMM) with respect to the first attachment request and a reason for evolved-packet-system session management (ESM) with respect to a PDN connection request.

13. The device of claim 10, wherein the receiving of the reason for rejecting the first attachment request from the communication network by the first communication circuit further comprises: receiving, from the communication network, a response and a reason indicating the device is to be detached.

14. The device of claim 11, wherein the initiating circuit is further configured to enable the N1 mode and initiate the corresponding process, to report the updated ability, after the specific time period elapses.

15. The device of claim 11, wherein the timer is stopped, the N1 mode is enabled and the corresponding process is initiated, to report the updated ability when one of following conditions occur: a different PLMN and APN are selected by the device; the device enters a different tracking area (TA); the device powers off and on again or a universal subscriber identity circuit USIM is removed from the device.

* * * * *